Figure 7:
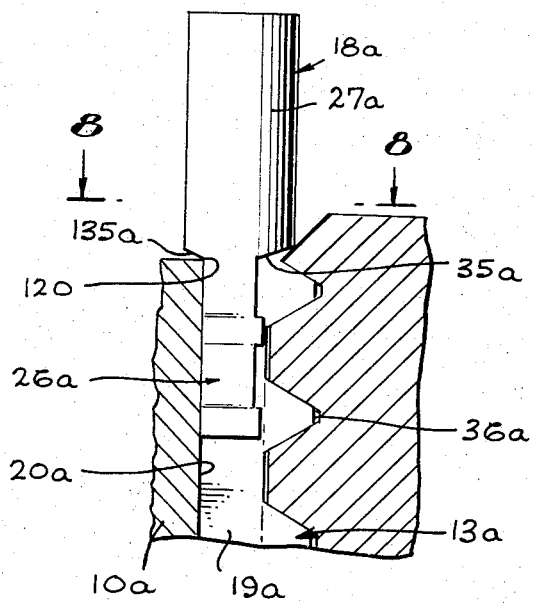

Oct. 10, 1967   R. NEUSCHOTZ   3,346,031
THREADED ELEMENTS AND LOCKING KEYS THEREFOR
Filed Sept. 21, 1965   2 Sheets-Sheet 1
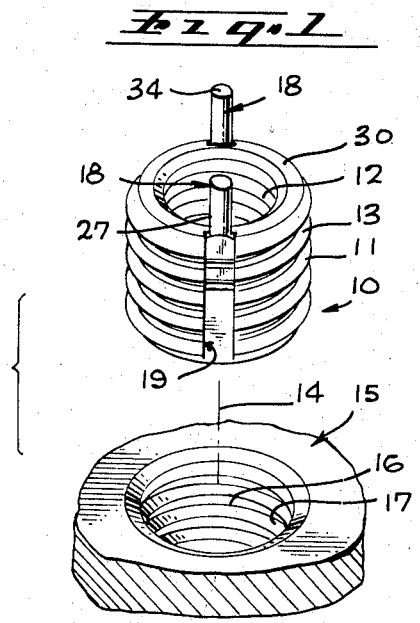
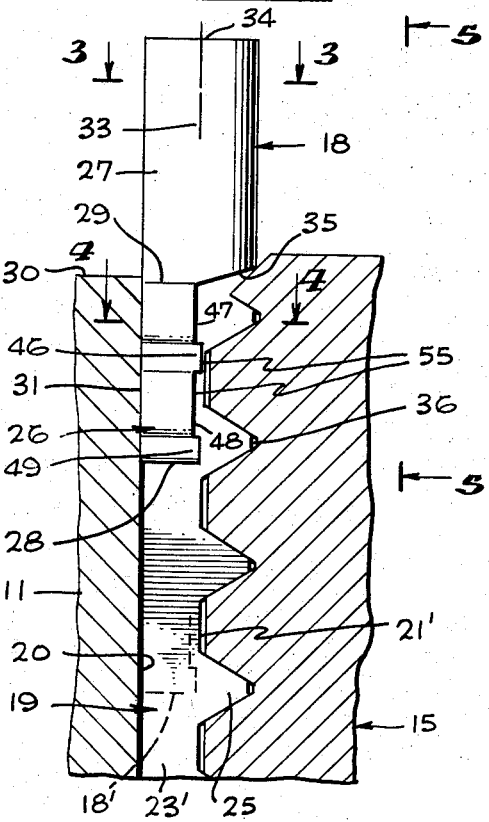
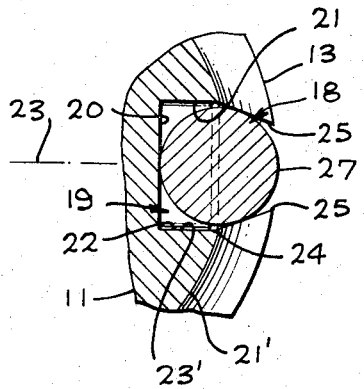
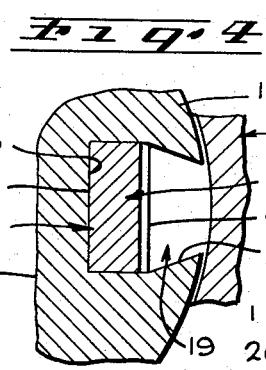
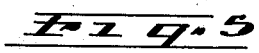
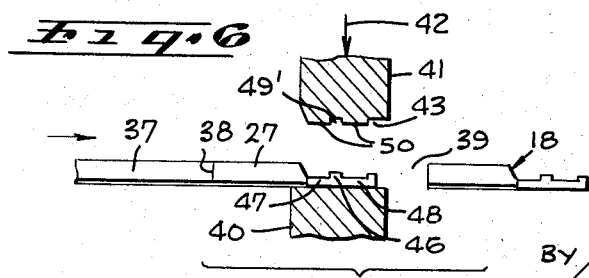
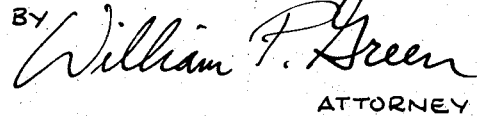
INVENTOR
ROBERT NEUSCHOTZ
BY William P. Green
ATTORNEY Oct. 10, 1967 R. NEUSCHOTZ 3,346,031
THREADED ELEMENTS AND LOCKING KEYS THEREFOR
Filed Sept. 21, 1965 2 Sheets-Sheet 2

ROBERT NEUSCHOTZ
INVENTOR.

BY William P. Green
ATTORNEY though, to best advantage, the groove may taper very slightly radially outwardly as it advances axially outwardly, as seen at 20 in FIG. 1.

United States Patent Office
3,346,031
THREADED ELEMENTS AND LOCKING KEYS THEREFOR
Robert Neuschotz, 1162 Angelo Drive, Beverly Hills, Calif. 90210
Filed Sept. 21, 1965, Ser. No. 488,931
9 Claims. (Cl. 151—23)

This invention relates to improvements in threaded elements of a type having one or more locking keys by which the elements may be secured within a carrier part. The novelty of the invention resides partially in the structure of the threaded elements and their keys, and partially in a unique method of forming the keys. The elements with which the invention is concerned are of a general type disclosed in my Patent Number 2,855,970, issued October 14, 1958, on "Insert Having Frictionally Retained Key Which Upsets Threads Of Base Member."

The threaded elements embodying the invention are provided with external threads adapted to be screwed into a passage in the carrier part and containing one or more grooves which extend generally axially through at least a portion of the external threads. A locking key is mounted within each of these grooves, and has a first axially inner portion which is thin enough radially to be received within the groove without interfering excessively with threaded advancement of the external threads into the carrier part. Axially outwardly of the mentioned first portion of the key, the latter has a second portion which is substantially thicker radially, and which projects radially outwardly far enough to cut into the material of the carrier part when the key is driven axially relative thereto, to thereby provide an interlock between the carrier part and threaded element acting to very positively and effectively retain the element against unscrewing rotation from the carrier part.

It is found that keys of this type are formed most economically by a process which commences with an elongated wire or strip of material, and then successively deforms and cuts off different portions of this wire to make the individual keys. More particularly, the wire may initially have a thickness at all points which is as great as the thickness ultimately desired for the axially outer locking portion of the key, and during the forming process this initially thick wire may be deformed to a thinner condition by application of appropriate force at the axially inner end of the key, to thereby form the desired inner thin portion of the key. Such localized thinning of the key in a radial direction acts to increase the width of the key in a second direction, to a width just sufficient to enable that portion to fit closely within the guiding groove in the threaded element, and be confined thereby. To attain maximum simplicity of manufacture, and to minimize the cost of the keys, particularly in the smallest sizes, the wire may initially be a simple externally cylindrical wire of conventional configuration.

In forming keys of the above discussed type, difficulty has been encountered in some instances in so shaping the thinned and widened axially inner portion of the key as to properly engage opposite sides of the guiding groove in the threaded element, in a manner preventing even the slightest shifting movement of the key within that groove. When forging or other force is applied to the wire to locally deform it, there is often a tendency for the thinned area to bulge laterally to a non-uniform width, with the greatest width usually being located near the longitudinal center of the thinned portion. Because of this non-uniform width, the thinned portion does not contact opposite sides of the groove wall effectively enough, and over a long enough area, to accurately and positively locate the key within the groove, and to prevent cocking movement of the key relative to the groove. As a result, the key and threaded element are not adequately secured together in fixed relative positions, and may not coact properly during installation within a carrier part, or during a locking operation. In some instances, the keys may be held so insecurely as to actually fall out of the grooves during handling prior to installation.

The major object of the present invention is to provide an improved structure and method for preventing this slight cocking motion of a key of the discussed type relative to an associated carrier part, by so shaping the thinned portion of the key as to assure its effective retention within and accurate confinement and location by the groove. For this purpose, I have found it desirable, in locally thinning the axially inner portion of the key, to so control the application of forging or other deforming force as to provide that thinned area with regions of slightly different thickness, but with all of these regions being much thinner than the axially outer locking portion of the key. Specifically, the thinned portion of the key is provided with a predetermined region which is very slightly thicker than two other regions located axially outwardly and axially inwardly respectively of the first region. When this is done, it is found that the slightly increased thickness of the first region prevents that region from being widened or bulged laterally as far as (at least no farther than) the other two discussed regions. These two radially thinner regions then act by virtue of their increased lateral width to provide two axially spaced locations at which the key is assured of engaging both of the opposite side walls of the groove. Thus, the engagement with the groove can not be localized at a single point, and the multiple point contact with the groove wall prevents cocking of the key within that groove.

Preferably, another slightly thickened region is provided axially inwardly beyond all three of the first mentioned regions, and desirably at the innermost extremity of the key. Also, it is preferred that all of the various regions extend essentially transversely of the length of the key, and preferably continue across the entire width of the key.

Figure 8:
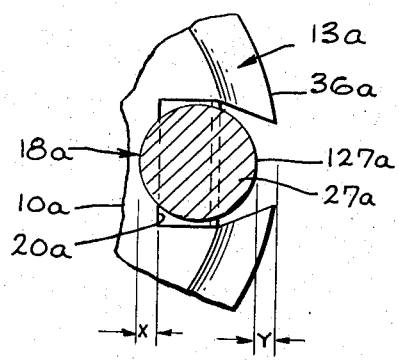

The above and other features and objects of the invention will be better understood from the following detailed description of the typical embodiment illustrated in the accompanying drawing, in which:

FIG. 1 shows an insert embodying the invention;
FIG. 2 is a section taken on line 2—2 of FIG. 1;
FIG. 3 is a plan view on line 3—3 of FIG. 2;
FIG. 4 is a section on line 4—4 of FIG. 2;
FIG. 5 is a front view of the key, taken on line 5—5 of FIG. 2;
FIG. 6 represents diagrammatically the method of forming the key;
FIG. 7 shows a variational form of key; and
FIG. 8 is taken on line 8—8 of FIG. 7.

Referring first to FIG. 1, I have shown at 10 a threaded insert, having an essentially tubular body 11 with internal threads 12 and external threads 13 centered about the axis 14 of the insert. The insert is to be connected into a carrier part 15, and more particularly into a passage 16 in the carrier part containing internal threads 17 shaped in correspondence with and adapted to threadedly engage external threads 13 of the insert.

The insert is locked within the carrier part by one or more locking keys 18, typically two such keys located at diametrically opposite points on the insert body 11. Each of these keys is received and confined within a groove 19 which extends generally axially, and preferably directly axially (parallel to axis 14) along the outer surface of body 11. These grooves 19 extend through at least a portion of the external threads 13, and may be of uniform cross section along their entire length. That cross section of the grooves 19 may be as illustrated in FIGS. 3 and 4, wtih each groove having a radially inner surface 20 and two opposite side walls 21 and 22 defining opposite sides of the groove. The inner wall 20 may extend directly axially, and lie in a plane disposed transversely of a plane 23 which contains and extends directly radially outwardly from axis 14. This wall may be located a short distance radially inwardly from the minor diameter surfaces 21' of external threads 13 of the element. Surfaces 21' are desirably short directly axial modified minor diameter surfaces, of a diameter slightly greater than threads 13 would have if these threads were completely standard threads. The two side walls 21 and 22 of each groove 19 are symmetrical with respect to the mentioned radial plane 23, and are desirably of undercut dove-tail configuration. Preferably, these side walls have first radially inner portions 23' which extend parallel to one another and perpendicular to surface 20, and which continue radially outwardly to locations 24 which are approximately at or slightly offset from the minor diameter surfaces 21'. Outwardly beyond the locations 24, side walls 21 and 22 have radially outwardly converging portions 25, which give to the groove the desired undercut dovetail cross section.

To describe now the structure of keys 18, each of these keys may be considered as having a first radially thin portion 26 at its axially inner end, and a second radially thicker portion 27 at the axially outer end of the key. Portion 26 extends from the inner extremity 28 of the key (FIG. 2) to a location 29 near the center of the length of the key, while portion 27 extends upwardly above the location 29. The thin portion 26 is initially received and located within the upper end of groove 19, while the thicker locking portion 27 of the key may initially project upwardly from the groove, and beyond the upper transverse end 30 of insert body 11. Portion 26 is a sufficiently tight fit within the groove to frictionally retain the key in a rigidly fixed position relative to the insert body 11, during normal handling of the device, and until the key is purposely driven axially by a hammer or the like to a locking position.

Portion 26 of the key has a radially inner planar surface 31, which engages surface 20 of groove 19. The opposite side surfaces 32 of portion 26 of the key are approximately parallel and extend approximately axially, to engage and be located and frictionally held by opposite side surfaces 23' of the inner portions of groove 19. As best seen in FIGS. 2, 3 and 4, portion 26 has a radial thickness which is approximately equal to the radial extent of surfaces 23, to be received within the uniform width portion of the groove, inwardly of the locations 24 of FIG. 3.

Locking portion 27 of the key may be of straight cylindrical configuration (see FIG. 3), about an axis 33 extending parallel to main axis 14 of the device. The axially outer end of portion 27 may have a transverse end surface 34, to be engaged by a hammer in driving the key axially to locking position. At its inner end, locking portion 27 of the key has a surface 35 which may be disposed generally transversely, but which preferably has the inclined configuration illustrated in FIG. 2, to advance axially as it advances radially inwardly. This surface 35 may extend radially outwardly to approximately the major diameter 36 of the insert threads, so that surface 35 and portion 27 of the key will cut into the material of the carrier part threads when the key is driven axially relative to the carrier part and insert.

FIG. 6 shows the manner in which a series of the keys 18 may be formed from successive portions of an elongated piece of wire 37, typically formed of stainless steel or other relatively hard material adapted to perform the cutting action required of the keys. This cylindrical wire can be considered as advancing progressively to the right in FIG. 6, with successive keys being cut off from the wire as indicated at the locations 38 and 39 of FIG. 6, and with each key being locally deformed by forging dies 40 and 41 or their equivalent, to reduce the thickness of each key at the location of its discussed portion 26. The portion 27 may then retain the original cross section of wire stock 37. The dies 40 and 41 are typically illustrated as including a lower flat anvil 40 for shaping surface 31 of the key, and an upper movable die 41, which moves downwardly as indicated by arrow 42, and which has an undersurface 43 shaped to strike the wire and give portion 26 of the key the desired shape.

FIG. 5 illustrates in enlarged form the manner in which the width dimension 44 of deformed portion 26 of the key, between opposite side surfaces 32 of FIG. 3, is controlled to assure contact with the side wall areas 23 of the groove at a purality of axially spaced locations. To attain this result, the deforming die 41 is shaped to provide a region 46 of portion 26 which is slightly thicker radially than are two adjacent regions 47 and 48 located at the axially outer and axially inner sides of region 46. More particularly, this may be accomplished by providing die 41 with a shallow cavity at 49', which extends upwardly slightly above the plane of the two bottom surfaces 50 which form regions 47 and 48 of the key. The slightly increased thickness at region 46 assures that the lateral width dimension of that region 46, in the direction indicated at 44 in FIG. 5, will not be greater than the corresponding width dimensions of the two regions 47 and 48, and will in most instances be very slightly less than the widths of regions 47 and 48. As a result, these two regions 47 and 48 may both tightly engage the two opposite side wall surfaces 23 of the groove, to assure proper confinement of portion 25 of the key within the groove, and prevent cocking of the key therein. Desirably, another slightly thickened region 49 is provided at the axially innermost extremity of the key, so that region 49, like region 46, has a width dimension no greater than, and usually slightly less than, regions 47 and 48. Thus, the portion 26 of the key is assured of contact with side walls 23 of the groove at the locations designated 50 and 51 in FIG. 5, and may or may not contact the side walls at the locations 52 and 53.

Preferably, the four regions 46, 47, 48 and 49 extend and are elongated transversely of the previously mentioned axis 33 of the outer portion of the key, with margins between the different regions being defined by lines 34 extending transversely of axis 33. The radially outer surfaces 55 of the four regions 46, 47, 48 and 49 may all extend parallel to rear or radially inner surface 31 of portion 26 of the key, so that each of the regions 46, 47, 48 and 49 may have a uniform radial thickness across its entire transverse extent, and its entire area.

As will be apparent from FIG. 2, region 47 may be of the same radial thickness as region 48, and region 46 may be of the same thickness as region 49. Preferably, the difference between the radial thickness of locking portion 27 and the thickness of each of the regions of portion 26 is many times as great as the very slight difference which exists between those different regions of portion 26 themselves. Also, it is desirable that portions 46 and 49 be not more than about three thousandths of an inch thicker than portions 47 and 48 (for best results not more than about one thousandth of an inch thicker). Further, all four regions of the portion 26 of the key should preferably be of a diameter to be received within the minor diameter of the carrier part threads (FIG. 2), so that the insert may be screwed into the carrier part without interference from portion 26.

In using the insert 10 of FIG. 1, a person first screws the insert into the carrier part to the position illustrated in FIG. 2, and may during this installation manipulate and turn the device by the outwardly projecting portions 27 of keys 18. When the insert reaches a point at which surfaces 35 of the keys contact the outer end of the carrier part threads, the advancement of the insert is automatically halted by such engagement, so that the depth of the insert relative to the carrier part is thus automatically set. Next, the keys are driven axially inwardly relative to the insert and carrier part, and to the broken line position illustrated at 18' in FIG. 2, so that portions 27 of the keys are driven through the carrier part threads to form an effective lock therewith.

FIGS. 7 and 8 show a slightly variational type of key 18a in which the cylindrical upper portion 27a of the key is offset radially inwardly farther than in FIG. 2 relative to the thinner portion 26a and groove 19a of insert 10a. Shoulder 35a is thus reduced slightly in radial extent relative to shoulder 35 of FIG. 2, and a second but smaller inclined shoulder 135a is formed adjacent the radially inner side of the key. With reference to FIG. 8, the radially inner part of the thickened portion 27a of the key projects inwardly a distance x beyond the plane of inner wall 20a of the groove. Also, it is desirable in this form that the radially outermost extremity 127a of portion 27a of the key be spaced inwardly from the major diameter 36a of insert threads 13a a distance y which is preferably substantially equal to dimension x.

When key 18a is driven downwardly, shoulder 135a engages the insert body at edge 120a in a relation camming the key radially outwardly sufficiently to be received within groove 19a in essentially the same relation as in the first form of the invention.

I claim:

1. The combination comprising an element having external threads adapted to be screwed into a recess in a carrier part, said element having a groove extending generally axially through at least a portion of said external threads, and a locking key received in said groove and adapted to be driven axially therein relative to the element to a locking position in which the key locks the element in said carrier part, said key having a first portion which is confined within the groove and guided thereby for generally axial sliding movement and which is thin enough radially to enable the element to be screwed into the carrier part without excessive interference by said first portion, said key having a second portion located axially outwardly of said first portion and projecting radially outwardly farther than said first portion to cut axially through the material of the carrier part in locking relation upon said generally axial movement of the key, said first portion of the key having a first substantially flat region near its axially outer end, a second substantially flat region axially inwardly of the first region, a third substantially flat region axially inwardly beyond said second region, and a fourth substantially flat region axially inwardly of said third region, said four regions extending substantially transversely across the width of the key, said second and fourth regions, though substantially thinner than said second portion, being slightly thicker radially, across the entire width of said first portion of the key, but not over about .003 of an inch thicker, than are said first and third regions, said key being in direct contact with the wall of said groove at said first and third regions of said first portion, said key being wider at said first and third regions than at said second and fourth regions.

2. A key to be received within and driven axially along a groove which extends through external threads of a threaded element, said key having a first portion to be confined within the groove and be guided thereby for generally axial sliding movement and which is thin enough radially to enable the element to be screwed into the carrier part without excessive interference by said first portion, said key having a second portion located axially outwardly of said first portion and projecting radially outwardly farther than said first portion to cut through the material of the carrier part in locking relation upon said generally axial movement, said first portion of the key having a first substantially flat region near its axially outer end, a second substantially flat region axially inwardly of the first region, a third substantially flat region axially inwardly beyond said second region, and a fourth substantially flat region axially inwardly of said third region, said second and fourth regions, though substantially thinner than said second portion, being slightly thicker radially, but not over about .003 of an inch thicker, than are said first and third regions, said key being wider at said first and third regions of said first portion than at said second and fourth regions to directly contact the wall of said groove at said first and third regions, said fourth region being located at and extending across the axially innermost extremity of the key, said four regions extending substantially transversely across the width of the key.

3. The combination comprising an element having external threads adapted to be screwed into a recess in a carrier part, said element having a groove extending generally axially through at least a portion of said external threads, said groove having two opposite side walls, and a locking key received in said groove and frictionally retained in fixed position therein prior to advancement of the element into said recess and adapted to be forceably driven generally axially relative to the element from said fixed position to a locking position in which the key locks the element in said carrier part, said key having a mounting portion which is confined within the groove and guided thereby for said generally axial driven movement and which is thin enough radially to enable the element and carrier key to be screwed into the carrier part without excessive interference by said mounting portion, said key having a locking portion located axially outwardly of said mounting portion and projecting radially outwardly farther than said mounting portion and to a position to cut axially through the material of the carrier part in locking relation upon said generally axial driven movement of the key, said mounting portion of the key having a first region which, though substantially thinner than said locking portion, is slightly thicker radially than are two other regions of said mounting portion which are located at opposite axial sides of the first region, and said mounting portion being a tight fit in said groove and in tighter frictional engagement with said side walls thereof at both of said two other regions than at said first region to retain the key in said fixed position until it is driven axially, and to prevent cocking of the key in the groove.

4. The combination as recited in claim 3, in which said first region extends essentially transversely across the width of said mounting portion of the key.

5. The combination as recited in claim 3, in which said first region of the mounting portion of said key is not over about .003 of an inch thicker than are said two other regions thereof.

6. The combination comprising an element having external threads adapted to be screwed into a recess in a carrier part, said element having a groove extending generally axially through at least a portion of said external threads, said groove having two opposite side walls, and a locking key received in said groove and frictionally retained in fixed position therein prior to advancement of the element into said recess and adapted to be forceably driven generally axially relative to the element from said fixed position to a locking position in which the key locks the element in said carrier part, said key having a mounting portion which is confined within the groove and guided thereby for said generally axial driven movement and which is thin enough radially to enable the element and carrier key to be screwed into the carrier part without excessive interference by said mounting portion, said key having a locking portion located axially outwardly of said mounting portion and projecting radially outwardly farther than said mounting portion and to a position to cut axially through the material of the carrier part in locking relation upon said generally axial driven movement of the key, said mounting portion of the key having a first region near its axially outer end, a second region axially inwardly of the first region, a third region axially inwardly beyond said second region, and a fourth region axially inwardly of said third region, said second and fourth regions, though substantially thinner than said locking portion, being slightly thicker radially than are said first and third regions, and said mounting portion being a tight fit in said groove and in tight frictional engagement with said side walls thereof at both of said first and third regions of said mounting portion to retain the key in said fixed position until it is driven axially, and to prevent cocking of the key in the groove.

7. The combination as recited in claim 6, in which said fourth region is located at, and extends across, the axially innermost extremity of the key.

8. A key to be received within and driven axially along a groove which extends through external threads of a threaded element, said key having a mounting portion to be confined within the groove and frictionally retained in fixed position therein and be guided thereby for generally axial driven movement and which is thin enough radially to enable the element to be screwed into the carrier part with said mounting portion in the groove and without excessive interference by said mounting portion, said key having a locking portion located axially outwardly of said mounting portion and projecting radially outwardly farther than said mounting portion and to a position to cut through the material of the carrier part in locking relation upon said generally axial movement, said mounting portion of the key having a first region which is slightly thicker radially than are two other regions of said mounting portion which are located at opposite axial sides of said first region, all of said regions being substantially thinner than is said locking portion of the key, said mounting portion being slightly wider at said two other regions than at said first region to contact the groove walls in tight frictional engagement at said two other regions, and to thereby frictionally retain the key in fixed position until driven, and against cocking movement.

9. A key to be received within and driven axially along a groove which extends through external threads of a threaded element, said key having a mounting portion to be confined within the groove and frictionally retained in fixed position therein and be guided thereby for generally axial driven movement and which is thin enough radially to enable the element to be screwed into the carrier part with said mounting portion in the groove and without excessive interference by said mounting portion, said key having a locking portion located axially outwardly of said mounting portion and projecting radially outwardly farther than said mounting portion and to a position to cut through the material of the carrier part in locking relation upon said generally axial movement, said mounting portion of the key having a first region near its axially outer end, a second region axially inwardly of the first region, a third region axially inwardly beyond said second region, and a fourth region axially inwardly of said third region, said second and fourth regions, though substantially thinner than said locking portion, being slightly thicker radially than are said first and third regions, said mounting portion being slightly wider at said first and third regions than at said second and fourth regions to contact the groove walls in tight frictional engagement at said first and third regions and to thereby frictionally retain the key in fixed position until driven, and against cocking movement.

References Cited

UNITED STATES PATENTS

| | | | |
|---|---|---|---|
| 616,419 | 12/1898 | Howard | 151—8 |
| 1,010,109 | 11/1911 | Badger | 151—23 |
| 1,240,245 | 9/1917 | Oller | 151—23 |
| 1,835,262 | 12/1931 | Bergman | 151—23 |
| 2,855,970 | 10/1958 | Neuschotz | 151—23 |
| 3,270,792 | 9/1966 | Neuschotz et al. | 151—23 |

CARL W. TOMLIN, *Primary Examiner.*

M. PARSONS, JR., *Assistant Examiner.*